No. 762,890. PATENTED JUNE 21, 1904.
E. E. EATON & R. A. FAY.
CUT-OFF VALVE FOR GAS PIPES.
APPLICATION FILED APR. 7, 1904.

NO MODEL.

Witnesses:
Oscar F. Hill
Aline Tarr

Inventors:
Elmer E. Eaton
Ray A. Fay
by William A. Copeland
Fred A. Fernald
Attorneys.

No. 762,890. Patented June 21, 1904.

UNITED STATES PATENT OFFICE.

ELMER E. EATON, OF CAMBRIDGE, AND ROY A. FAY, OF BOSTON, MASSACHUSETTS.

CUT-OFF VALVE FOR GAS-PIPES.

SPECIFICATION forming part of Letters Patent No. 762,890, dated June 21, 1904.

Application filed April 7, 1904. Serial No. 201,992. (No model.)

*To all whom it may concern:*

Be it known that we, ELMER E. EATON, of Cambridge, in the county of Middlesex, and Roy A. FAY, of Boston, in the county of Suffolk, State of Massachusetts, have invented certain new and useful Improvements in Cut-Off Valves for Gas-Pipes, of which the following is a specification.

Sometimes while the gas is lighted it is suddenly turned off in the main or pipe, thereby extinguishing the light, and then suddenly turned on while the stop in the fixture is still open, allowing the gas to escape. Sometimes the stops are accidentally opened by persons who are either careless or unfamiliar with them and the gas left escaping. Sometimes there is a sudden stoppage in the mains or pipes caused by the accumulation of frost, which on melting may allow the gas to suddenly flow again. Sometimes water is formed in pipes or mains by condensation, owing to change in temperature or by the melting of frost formations, and is forced by the pressure of gas to some point where for a time it entirely cuts off the flow of gas, and later the water may be forced still farther along where the gas will be allowed to suddenly flow freely again. The result is the escape of gas undiscovered into apartments where the gas had been left burning at the fixture or in heaters. Leakages of this character sometimes occur also in taps and branches.

The object of the present invention is to provide an automatic safety cut-off valve to prevent the escape of gas under such circumstances as above described or whenever the gas is turned on and not lighted.

The invention will now be fully described, reference being had to the accompanying drawings, and the novel features thereof will be particularly pointed out in the claims at the close of the specification.

Figures 1, 2:
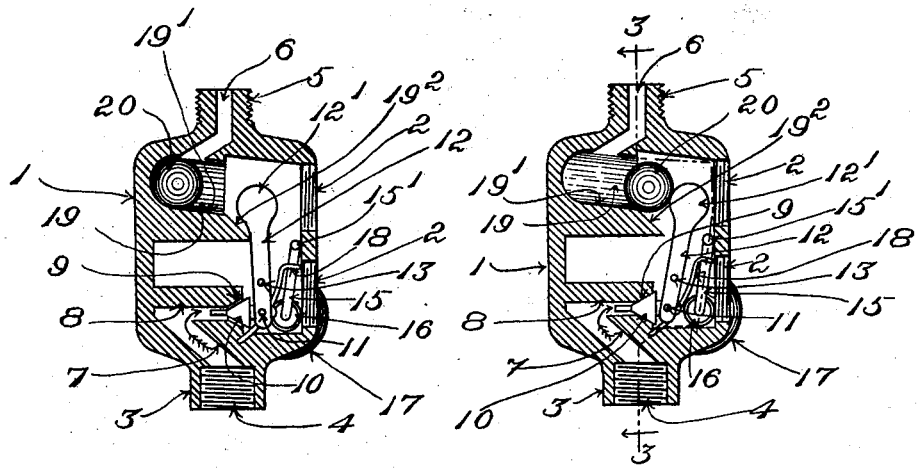
Figure 3:
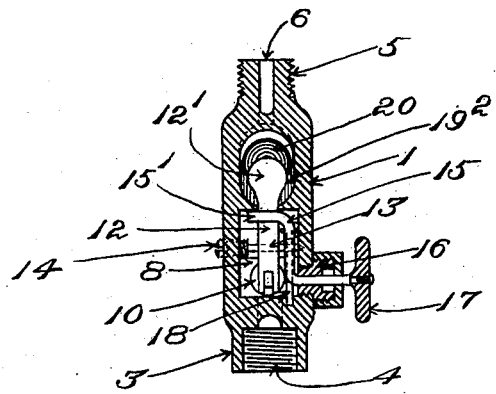

In the drawings, Figure 1 is a vertical section of a device embodying the invention, showing the position of the parts when the valve has been opened to allow the gas to pass through to the burner. Fig. 2 is a section on the same line as Fig. 1, showing the position of the parts when the valve has become closed. Fig. 3 is a sectional view taken at right angles to that of Figs. 1 and 2 looking at the valve from the right-hand side of Fig. 1 and showing the hand-lever in engagement with the valve-lever.

The shell or case 1 is chambered to receive the working parts of the valve and allow them to move freely and is formed with openings 2 2, necessary for the construction and assembling of the valve. These openings 2 2 are closed gas-tight with plugs after the parts are assembled. The lower end of the shell is formed with a tubular boss 3, having a passage-way 4 leading into the interior of the shell, and is screw-threaded, preferably on the interior, to permit it to be screwed to the end of the gas-pipe. The upper end of the shell is also formed with a tubular boss 5, having a passage-way 6 leading out of the chamber, and is screw-threaded, preferably on the exterior, to permit the burner to be screwed onto it. The base of the shell is formed with an inclined flange or wall 7, projecting inwardly and upwardly, forming a turn in the passage from the tubular boss 3 into the chamber. This wall extends crosswise of the chamber widthwise. Projecting laterally inward from the side of the shell, also crosswise thereof and above the wall 7, is a ledge or flange 8, which laps over the upper side of wall 7, thus giving another turn to the passage-way, as indicated by the arrow. The adjacent inner ends of the flanges 7 and 8 are beveled concave to form a seat 9 for the cone-valve 10. The stem of valve 10 is pivoted at 11 to a lever 12, so as to allow a swinging movement to the valve in order to insure a perfect adjustment of the valve to its seat. Lever 12 is pivoted by means of a pintle 13, which preferably has needle-point bearings to avoid friction. One end of the pintle is journaled in one of the side walls of the shell, and the other end is journaled in an adjustable screw 14. The pivot or fulcrum of the lever 12 is below the center of gravity, so that when the lever is tipped, as shown in Fig. 2, and the valve is closed the overweight of the upper portion will hold the lever in the inclined position and the valve closed until positively opened again in some way. Preferably the upper portion of the lever 12 is enlarged, forming a head 12′, or otherwise weighted to hold the lever in its inclined position. The overweight of the upper end should, however, be so proportioned that after the valve has been opened and the gas is turned on the normal pressure of the gas will be sufficient to maintain the valve open. Passing through the side of the shell is a bent lever 15, having an arm 15′, which is adapted to engage the lever 12 and turn it up again into the position shown in Fig. 1 for opening the valve. The lever passes through a stuffing-box 16 in the side of the shell and is operated by a hand-wheel 17. A spring 18 pushes the lever 15 back again into the position shown in Fig. 1, when the hand-wheel is released. Extending inwardly from the wall of the shell above the flange 8 is a duct 19 for a ball or roller 20. The bottom 19′ of this duct 19 is formed with a gentle incline, and the inner end $19^2$ is beveled. The weight of the ball 20 is not so great but that the normal pressure of the gas when turned on will be sufficient to retain the ball in the upper end of the duct. When the flow of gas is stopped for any reason and the pressure on the ball is thereby released, the ball will roll down the inclined bottom 19′ of the duct and engage the weighted end of lever 12, turning the lever 12 on its pivot into the position shown in Fig. 2 and closing the valve. The ball is so proportioned to the space between the end of the duct 19 and the lever 12 that it will drop slightly and wedge between the inclined end of the duct and the lever 12, thus holding the valve closed. Now when the gas is turned on again or the obstruction removed the pressure will not be sufficient to turn the lever 12 against the wedging of the ball, but it may easily be turned by means of the hand-wheel 17.

Across the passage 4 will preferably be a wire-gauze screen to obstruct passage of particles that are liable to be forced along in the pipe, so that they may not be lodged in the working parts of the valve.

When the lever 12 is turned by means of the hand-wheel 17 so as to take the position shown in Fig. 1, the cone-valve 10 is drawn from its seat 9, and at the same time the lever 12 also forces the ball 20 up over the beveled end $19^2$ of the duct 19 onto the bottom 19′ of the duct. The lever 12 and cone-valve 10 are then in the position shown in Fig. 1, allowing the gas to flow through the shell 1. Ball 20 is then carried along the bottom 19′ to the position shown in Fig. 1 and is maintained in that position until the flow of gas ceases or is greatly diminished. When the pressure of gas ceases or is greatly diminished, the ball 20 rolls along down the bottom 19′ and engages the head of lever 12 and by pressure causes the cone-valve 10 to move forward onto the seat 9, as shown in Fig. 2, thus preventing any subsequent flow of gas into the shell 1 until the valve 10 is again opened by means of the hand-wheel 17.

What we claim is—

1. An automatic safety-stop to prevent the escape of gas consisting of a case having a passage-way therethrough, a valve having a seat in said passage-way and closing the passage when on its seat, a lever which is connected with said valve and which is fulcrumed intermediate its ends, a gravity member which is normally held out of engagement with said lever by the pressure of the gas, and which when the flow of gas is stopped moves into engagement with said lever and turns it on its fulcrum and seats the valve, and hand-operated means for moving the valve to open the passage-way, substantially as described.

2. An automatic safety-stop to prevent the escape of gas consisting of a case having a passage-way therethrough, a valve having a seat in said passage-way and closing the passage when on its seat, a lever which is pivotally connected at one end to said valve and which is fulcrumed intermediate its ends, a roller and an inclined seat therefor, said roller being held back on its seat by the pressure of the gas when the valve is open and the gas flowing, and rolling down into engagement with said valve-lever and closing the valve when the flow of gas is stopped, and hand-operated means for moving the lever to open the valve, substantially as described.

3. An automatic safety-stop to prevent the escape of gas consisting of a case having a passage-way therethrough, an inlet at one end and an outlet at the other end, the inlet end being constructed for attachment to a gas-pipe and the outlet end being constructed to receive a pipe or burner, a valve having a lateral movement and having a seat in said passage-way, an upright lever which is pivotally connected at one end to said valve and which is fulcrumed intermediate its ends below the center of gravity, a roller and an inclined seat therefor, said roller being held back on its seat by the pressure of the gas when the valve is open and the gas flowing, the inclined seat being so located that when the flow of gas into the inlet end of the case is cut off, the roller will roll down into engagement with the upper arm of the valve-lever and turn the lever to close the valve, and a wedging-space for said roller between its seat and the said valve-lever, substantially as described.

4. An automatic safety-stop to prevent the escape of gas consisting of a case having a passage-way therethrough, a valve having a lateral movement to open and close said passage-way, a seat for said valve, a lever which is pivotally connected at one end to said valve and which is fulcrumed intermediate its ends, a duct which projects from the side of the case inwardly toward the upper arm of said lever, and sloping toward the lever, a roller in said duct, said roller being held back from the edge by the pressure of the gas when the gas is flowing and the valve is open, and rolling down into engagement with said valve-lever thereby closing the valve when the pressure from the flow of gas is stopped, a hand-lever which engages with said valve-lever and which extends out through said case and means for operating said hand-lever whereby it may be turned to move the valve-lever and open the valve, and a spring which turns said hand-lever in the reverse direction when it is released, substantially as described.

In testimony whereof we have affixed our signatures in presence of two witnesses.

ELMER E. EATON.
ROY A. FAY.

Witnesses:
 FRED A. FERNALD,
 WILLIAM A. COPELAND.